(12) United States Patent
Taguchi

(10) Patent No.: US 6,948,006 B1
(45) Date of Patent: Sep. 20, 2005

(54) HOST SYSTEM THAT PROVIDES DEVICE DRIVER FOR CONNECTED EXTERNAL PERIPHERAL IF DEVICE DRIVER TYPE IS AVAILABLE OR DEVICE DRIVER IS DOWNLOADED FROM MEMORY OF EXTERNAL PERIPHERAL TO HOST SYSTEM

(75) Inventor: Tomishige Taguchi, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/312,823

(22) Filed: May 17, 1999

Related U.S. Application Data

(60) Division of application No. 08/307,494, filed on Sep. 16, 1994, now Pat. No. 6,298,388, which is a continuation of application No. 07/803,608, filed on Dec. 9, 1991, now abandoned.

(30) Foreign Application Priority Data

Dec. 12, 1990 (JP) .................................. 2-401447

(51) Int. Cl.[7] ........................ G06F 13/00; G06F 13/12; G06F 3/00
(52) U.S. Cl. ................... 710/8; 710/9; 710/10; 710/11; 710/14; 710/16; 710/52; 710/64; 400/61
(58) Field of Search .............................. 710/8–10, 14, 710/52, 64, 11, 16; 395/500; 400/61

(56) References Cited

U.S. PATENT DOCUMENTS

| | | | | |
|---|---|---|---|---|
| 4,486,827 A | * | 12/1984 | Shima et al. ................ 710/261 |
| 4,561,711 A | | 12/1985 | Zrnich ........................ 439/630 |
| 4,589,063 A | * | 5/1986 | Shah et al. ..................... 710/8 |
| 4,660,999 A | * | 4/1987 | Tsuneki ....................... 400/61 |
| 4,680,674 A | | 7/1987 | Moore ........................ 345/156 |

(Continued)

FOREIGN PATENT DOCUMENTS

EP 0-251477 1/1988

(Continued)

OTHER PUBLICATIONS

IBM Technical Disclosure Bulletin, Jun. 1990, "Using Device Names to Dynamically Switch Printer Data Streams", vol. 33, Issue 1b, pp. 150-152.*

(Continued)

Primary Examiner—Tammara R. Peyton
(74) Attorney, Agent, or Firm—Fitzpatrick, Cella, Harper & Scinto

(57) ABSTRACT

There is provided an electronic apparatus which also enables the data input/output apparatus to be executed at a high speed to a small electronic apparatus having a limited installation space by using an IC card interface. In an electronic apparatus in which a detachable IC card is connected to an IC card junction portion and a CPU bus of the electronic apparatus main body is connected to the IC card by the junction portion and the IC card is used as an external memory device, there is provided pseudo card means having a junction portion which can be connected to the IC card junction portion of the electronic apparatus main body, and further, the pseudo card means has control means for converting the data input/output interface between the electronic apparatus and the pseudo card means and the data input/output interface between a predetermined external apparatus and the pseudo card means, wherein the data input/output operation can be executed between the apparatus main body and the external device at a high speed by using the bus of the IC card through the pseudo card means connected to the IC card junction portion.

8 Claims, 8 Drawing Sheets

U.S. PATENT DOCUMENTS

| | | | | |
|---|---|---|---|---|
| 4,763,281 A | * | 8/1988 | Arakawa | 395/110 |
| 4,775,931 A | * | 10/1988 | Dickie et al. | 710/9 |
| 4,796,099 A | * | 1/1989 | Compton | 386/55 |
| 4,796,215 A | | 1/1989 | Hatta | 364/920 |
| 4,815,034 A | * | 3/1989 | Mackey | 710/64 |
| 4,821,107 A | | 4/1989 | Naito et al. | 358/300 |
| 4,826,332 A | * | 5/1989 | Ukai et al. | 400/70 |
| 4,855,779 A | | 8/1989 | Ishikawa et al. | 257/131 |
| 4,866,601 A | * | 9/1989 | DuLac et al. | 711/111 |
| 4,902,146 A | * | 2/1990 | Ishikawa | 400/61 |
| 4,926,347 A | * | 5/1990 | Uchida et al. | 395/112 |
| 4,980,856 A | | 12/1990 | Ueno | 361/729 |
| 5,038,320 A | * | 8/1991 | Heath et al. | 710/10 |
| 5,083,262 A | * | 1/1992 | Haff, Jr. | 395/500.48 |
| 5,101,444 A | | 3/1992 | Wilson et al. | 382/291 |
| 5,136,709 A | * | 8/1992 | Shirakabe et al. | 395/710 |
| 5,175,820 A | * | 12/1992 | Gephardt | 710/14 |
| 5,179,666 A | | 1/1993 | Rimmer et al. | 364/230 |
| 5,207,586 A | | 5/1993 | MacGregor et al. | 439/946 |
| 5,257,388 A | * | 10/1993 | Hayamizu | 711/115 |
| 5,274,765 A | | 12/1993 | Le Gallo | 710/64 |
| 5,317,693 A | | 5/1994 | Cuenod et al. | 364/940.1 |
| 5,359,713 A | * | 10/1994 | Moran et al. | 710/52 |
| 5,430,845 A | | 7/1995 | Rimmer et al. | 364/280 |

FOREIGN PATENT DOCUMENTS

| | | |
|---|---|---|
| EP | 0-351961 | 1/1990 |
| EP | 0-394114 | 10/1990 |
| EP | 0-426414 | 5/1991 |
| JP | 63-208919 | 8/1988 |
| JP | 363273954 | * 11/1988 |
| JP | 01-149118 | 6/1989 |
| JP | 1-164550 | 11/1989 |
| JP | 2-122355 | 5/1990 |
| JP | 2-257341 | 10/1990 |
| WO | WO 89/08897 | 9/1989 |

OTHER PUBLICATIONS

Steve Gibson, "Device Driver 'Stubs' Smooth Path To Top SCSI Performance", *Infoworld*, Nov. 19, 1990.

* cited by examiner

| 1ST ROW | | | | 1ST ROW | | | |
|---|---|---|---|---|---|---|---|
| NO. | SIGNAL | NO. | SIGNAL | NO. | SIGNAL | NO. | SIGNAL |
| 1 | GND | 18 | NC | 35 | GND | 52 | NC |
| 2 | $D_3$ | 19 | $A_{16}$ | 36 | $\overline{LP_1}$ | 53 | NC |
| 3 | $D_4$ | 20 | $A_{15}$ | 37 | NC | 54 | NC |
| 4 | $D_5$ | 21 | $A_{12}$ | 38 | NC | 55 | *NC |
| 5 | $D_6$ | 22 | $A_7$ | 39 | NC | 56 | *NC |
| 6 | $D_7$ | 23 | $A_6$ | 40 | NC | 57 | *NC |
| 7 | $\overline{CS_1}$ | 24 | $A_5$ | 41 | NC | 58 | NC |
| 8 | $A_{10}$ | 25 | $A_4$ | 42 | NC | 59 | NC |
| 9 | $\overline{OE}$ | 26 | $A_3$ | 43 | NC | 60 | *NC |
| 10 | $A_{11}$ | 27 | $A_2$ | 44 | NC | 61 | *NC |
| 11 | $A_9$ | 28 | $A_1$ | 45 | CST | 62 | *NC |
| 12 | $A_8$ | 29 | $A_0$ | 46 | $A_{17}$ | 63 | BAT |
| 13 | $A_{13}$ | 30 | $D_0$ | 47 | $A_{18}$ | 64 | NC |
| 14 | $A_{14}$ | 31 | $D_1$ | 48 | $A_{19}$ | 65 | NC |
| 15 | $R/\overline{W}$ | 32 | $D_2$ | 49 | NC | 66 | NC |
| 16 | NC | 33 | WF | 50 | NC | 67 | $\overline{LP_2}$ |
| 17 | $V_{CC}$ | 34 | GND | 51 | $V_{CC}$ | 68 | GND |

FIG. 3

HOST SYSTEM THAT PROVIDES DEVICE DRIVER FOR CONNECTED EXTERNAL PERIPHERAL IF DEVICE DRIVER TYPE IS AVAILABLE OR DEVICE DRIVER IS DOWNLOADED FROM MEMORY OF EXTERNAL PERIPHERAL TO HOST SYSTEM

This application is a divisional of U.S. patent application Ser. No. 08/307,494, filed Sep. 16, 1994, now U.S. Pat. No. 6,298,388 B1, which is a continuation of U.S. patent application Ser. No. 07/803,608, filed Dec. 9, 1991, now abandoned.

BACKGROUND OF THE INVENTION

1. Field of the Invention

The invention relates to an electronic apparatus and, more particularly, to an electronic apparatus in which a detachable IC card is connected to an IC card junction portion and a CPU bus of the electronic apparatus main body is connected to the IC card by the junction portion and the IC card is used as an external memory device.

2. Related Background Art

FIG. 8 shows an external view of a conventional data processing apparatus such as personal computer, word processor, or the like and an IC card which is used as a small external memory device for the data processing apparatus.

A construction of a data processing apparatus 90 shown in FIG. 8 is used in a word processor, a personal computer, or the like and has a display 68 comprising an LCD panel or the like and a keyboard 86 as user interface means. The apparatus 90 also has an IC card 50 as an external memory device. Reference numeral 91 denotes an eject lever to remove the IC card 50.

As shown in FIG. 9, a control system of the data processing apparatus 90 comprises: a CPU 65; various control circuits which are connected to a data/address bus of the CPU 65; the display 68; a power source (P/S) section 84; and the key input section 86.

The IC card 50 is connected through an IC card connector 60 in a slot which is formed in the side wall of the keyboard 86 in FIG. 8.

The IC card is used as a memory area to store processing data of the apparatus main body, operation data or KANJI (Chinese characters) font data which has already been stored in the card, or data of utility softwares, or the like.

A plurality of read only memories (ROMs) 54 and a plurality of random access memories (RAMs) 55 are enclosed in the IC card 50 and are connected to the IC card connector 60 through a buffer 53 and a junction portion 51 by an address/data/control bus 56.

The address/data/control bus of the data processing apparatus 90 and signal lines of a power source and the like are also connected from the apparatus main body to the IC card connector 60 through a buffer 62 as necessary as shown in FIG. 10. The signal is connected to the IC card 50 by the connector.

To the address/data/control bus of the CPU 65, there are connected: a KANJI (or Chinese characters) ROM 69; a DMA controller 70; an RAM 82; an ROM 83; a timer 81; an I/O controller 71; a display controller 66 to control the input/output operation for the display 68 and keyboard 86; a key input controller 85; and the like.

An external expansion bus connector 89 is provided on the rear wall (not shown in FIG. 8) of the main body. A hard disc or an external control unit can be connected to the external expansion bus connector 89 through an exclusive control board and can be used to expand the external memory or to control the apparatus.

In recent years, the realization of miniaturization of the apparatus is more and more progressed. In the apparatus as mentioned above, it is becoming impossible to provide a space enough to attach both the connector 60 for the IC memory and the external expansion bus connector 89. For instance, there are also commercially available a portable data processing apparatus and the like such as IC card system pocket book, IC card electronic calculator, and the like having a small space only for providing a connector terminal for the IC card.

On the other hand, in such an apparatus as well, a high function such as a high processing speed to input/output data from/to an external apparatus or the like is required similarly to the case of a desktop type personal computer or the like.

As mentioned above, however, in recent years, it is difficult to assure an installation space of the connector to input/output for an external device. In the conventional construction, there is a case of a countermeasure such that the control of the external device and data input/output operation are executed or the like by using a serial communication connector. This is because an installation space for the serial communication connector is smaller than that for the external expansion bus connector since the serial communication connector has only a signal line.

According to the above method, however, the high-speed input/output operation cannot be executed by the communication using the serial communication connector. Such a method can be used for only an interface with a relatively low-speed external device such as printer, analog modem, or the like. It is difficult to apply the above method to an application field such that the memory of the IC card of a small capacity is expanded by connecting an external memory or the like.

SUMMARY OF THE INVENTION

It is the first object of the invention that even in a small electronic apparatus having a limited installation space, the data input/output operation can be executed at a high speed by using an IC card interface.

The second object of the invention is to enable the input/output operation with an external device such as an external memory device or the like to be performed through pseudo card means connected under the same junction condition as that for the IC card connector.

BRIEF DESCRIPTION OF THE DRAWINGS

FIG. 3 is a diagram of a table showing a pin arrangement of a junction portion on the pseudo IC card side;

DETAILED DESCRIPTION OF THE PREFERRED EMBODIMENTS

Figure 1:
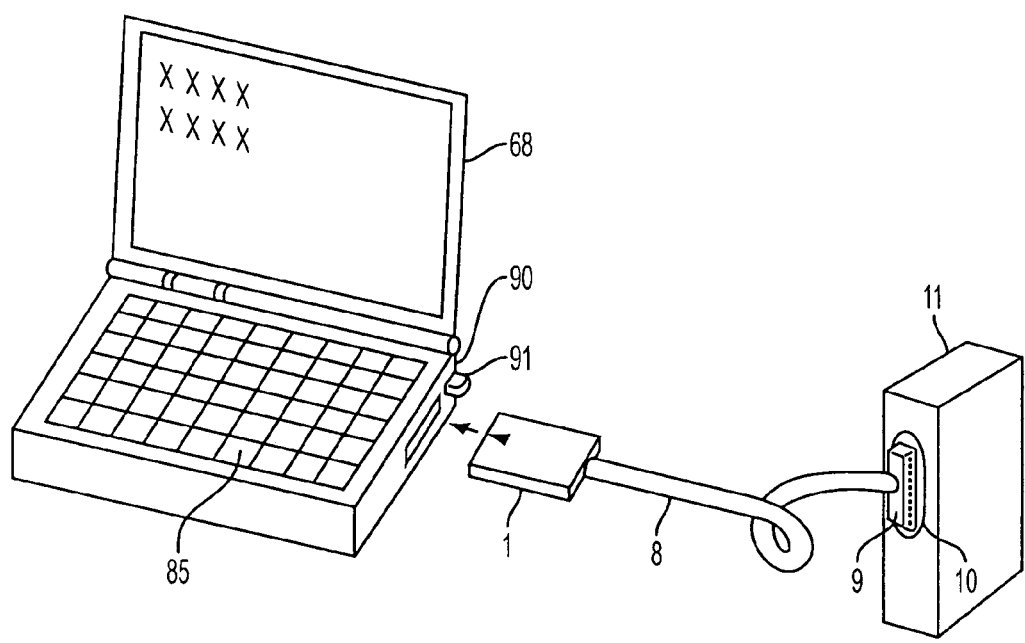
FIG. 1 is a perspective view showing an external view of a data processing apparatus employing the invention.

The invention will be described in detail hereinbelow on the basis of an embodiment shown in the drawings. In the following description, the same or corresponding members as those of the conventional apparatus are designated by the same reference numerals and their detailed descriptions are omitted.

According to the invention, an external device (an expansion port of an external expansion memory device such as floppy disk, hard disk device, semiconductor memory, etc., another apparatus such as computer, word processor, etc., or the like) is connected to the data processing apparatus 90 by using an IC card interface.

As shown in FIG. 1, in an electronic apparatus using the invention, a pseudo IC card (second card) 1 is inserted into an IC card slot (inserting hole) and used in place of the IC card (first card) 50. The pseudo IC card 1 is constructed as a pseudo IC card section. The CPU of the data processing apparatus 90 executes the input/output operation to the same interface as the ordinary IC card 50 for the pseudo IC card 1, so that the CPU can perform the input/output operation to an external device 11.

The pseudo IC card 1 has a cable 8 to execute the input/output operation to the external device 11. The cable 8 is connected to the external device 11 through connectors 9 and 10. In the above construction, since the input/output interface between the pseudo IC card 1 and the external device 11 can be executed irrespective of the data processing apparatus 90 side, it can be performed by arbitrary means such as an SCII interface or the like.

Explanation will now be made hereinbelow with respect to an example in which the external device 11 is constructed as an external expansion memory device such as floppy disk, hard disk device, semiconductor memory, or the like and supplements the capacity of the IC card and data is handled as if the apparent capacity of the IC card when it is seen from the data processing apparatus 90 increased.

Figure 2:
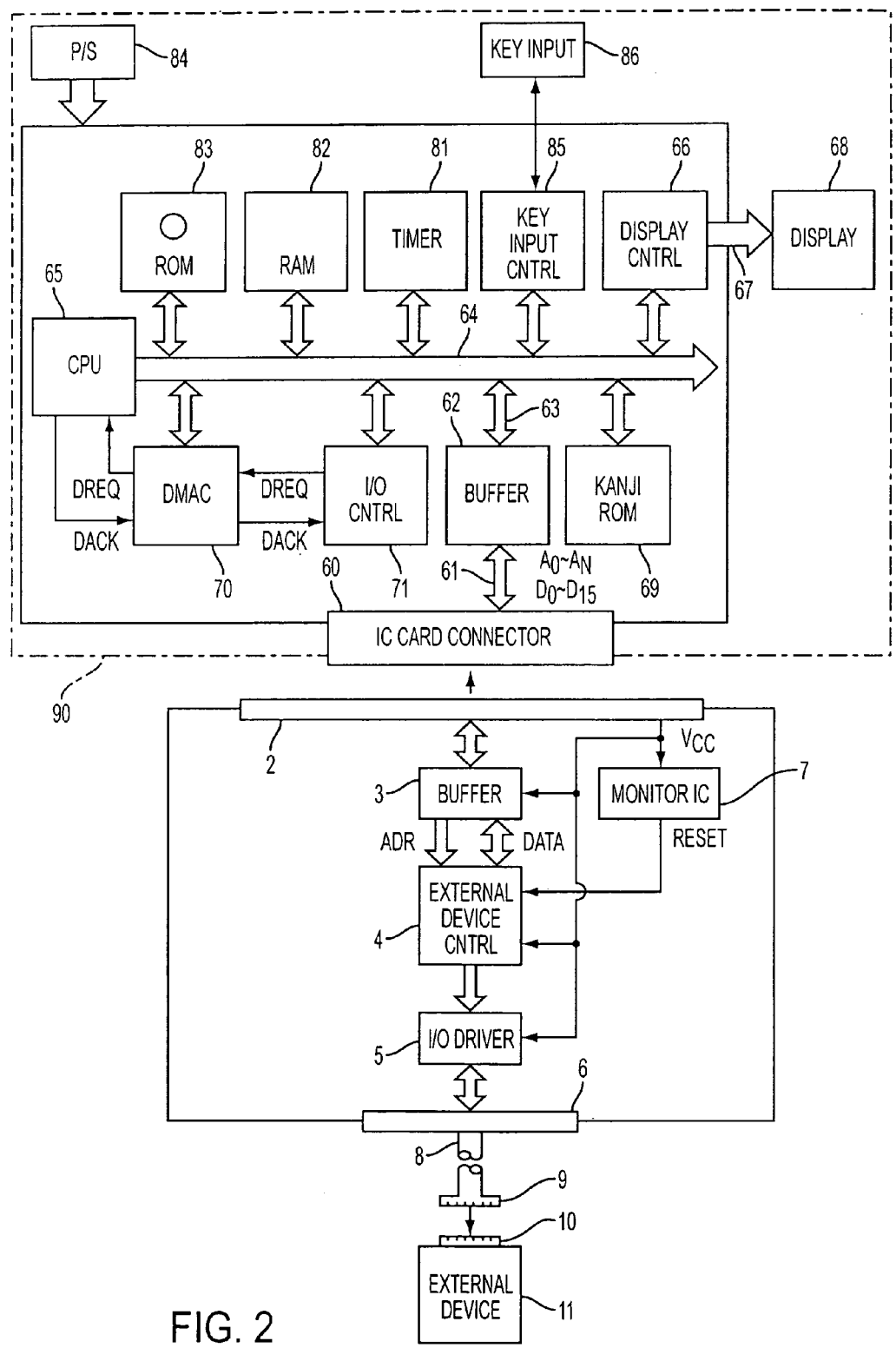
FIG. 2 is a block diagram of a control system of the apparatus of FIG. 1.

In FIG. 2, in a manner similar to the conventional apparatus, the data processing apparatus 90 is constructed by the display 68, power source section 84, and key input section 86 and has the IC card connector 60 on the side wall of the apparatus main body at a position adjacent to the key input section.

In a manner similar to the conventional apparatus, internal circuits of the data processing apparatus 90 comprise: the RAM 82 to store data or utility softwares1 the timer IC 81 which is used to calculate an execution period or an operation time1 the key input controller 85 to convert a key input code from the key input section 86 into a code in a form which can be easily read by the CPU 65; the display controller 66 to convert display characters sent from the CPU 65 so as to be displayed by the display 68 such as LCD or plasma display; the KANJI (or Chinese characters) ROM 69 which is referred to as necessary to convert the display characters to the display 68 into KANJI1 the I/O controller 71 of a communication control IC such as an RS232C or the like for communication with the outside; a DMA controller 70 to control a DMA (direct memory access) from the I/O controller 71; and the like.

The apparatus of the invention differs from the conventional apparatus with respect to points that the pseudo IC card 1 is not constructed so as to use the self internal memory as in the IC card but has an external device controller 4 to control the input/output operation to the external device 11, an I/O driver 5, a mold member 6 to connect the cable 8 and the I/O driver 5, and a monitor 7 to assure the safety.

A buffer 3 receives an input/output signal for the apparatus main body from a junction portion 2 and electrically protects the internal circuits. The external device controller 4 converts the signal from the buffer into a signal timing of the external device. The I/O driver 5 is provided to execute the input/output operation to the external device 11 by a predetermined interface system (SCII or the like) which can accurately perform the communication between the external device controller 4 and the external drvice 11 even when the cable 8 is long to a certain extent.

Further, the monitor 7 monitors a power source voltage which is supplied from the data processing apparatus 90 to the pseudo IC card 1 through the junction portion 2 and gives a reset signal to the external device controller 4 at a time point when the power source voltage is lower than a predetermined voltage, thereby preventing a runaway of the CPU.

FIG. 3 is a table diagram showing a pin arrangement of two rows of the junction portion 2 of the pseudo IC card 1 in order to connect the pseudo IC card 1 with the data processing apparatus 90. Numbers in the table indicate the pin numbers and each signal name is shown by a code which is generally used. For instance, GND indicates a ground potential; $D_0$ to $D_n$ denote bits of the data bus; $A_0$ to $A_n$ bits of the address bus; CS chip enable; and NC non-connection.

Figure 4:
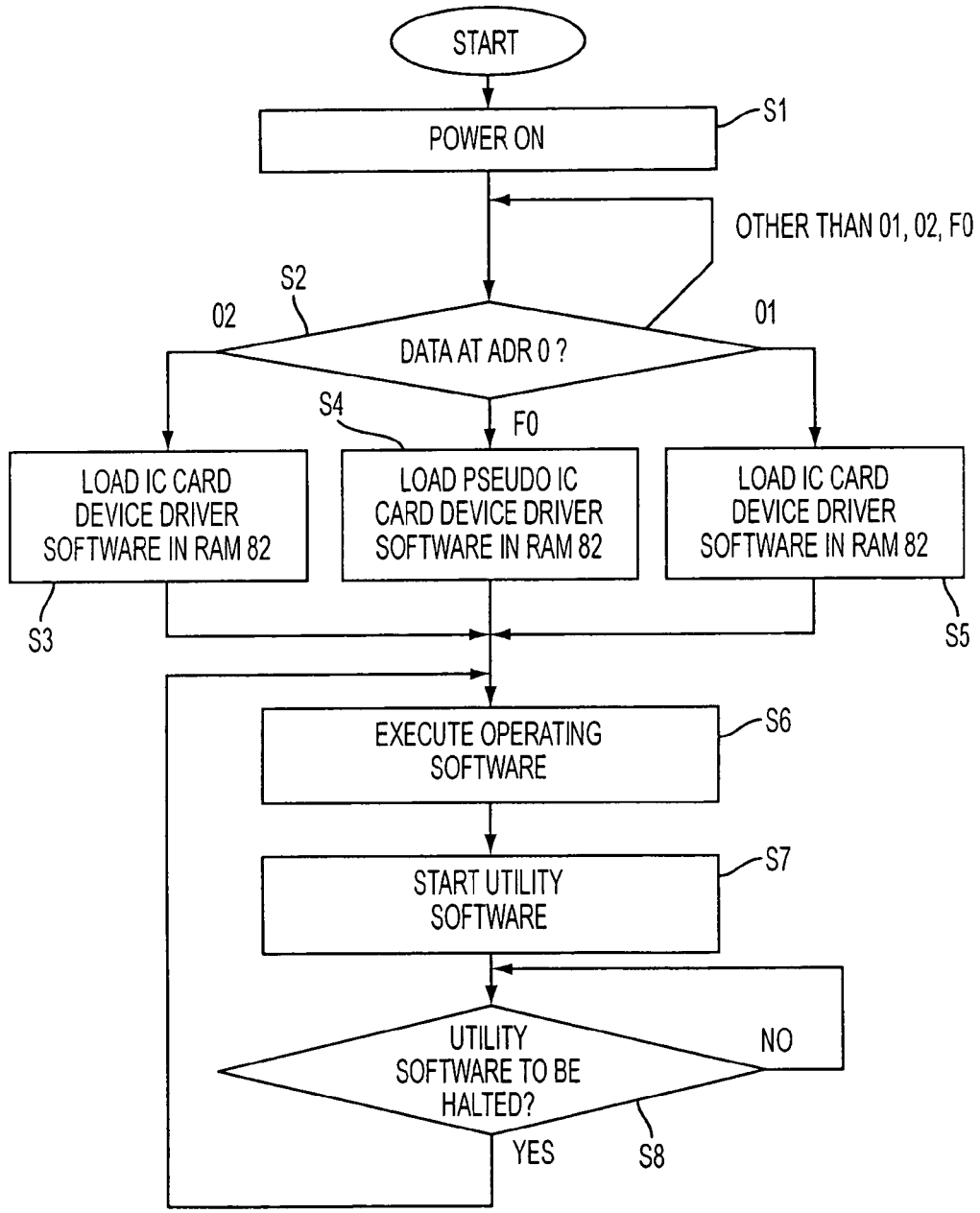
FIG. 4 is a flowchart showing the operation of the apparatus of FIG. 1.

The operation in the above construction will now be explained with reference to FIGS. 4 and 5. FIG. 4 shows a control procedure of the data processing apparatus 90 by the CPU 65.

When a power source is turned on in step S1 in FIG. 4, the CPU 65 starts the execution of the operating system software of the data processing apparatus stored in the ROM 83 and starts to check the function of each of the internal ICs.

Figure 5:
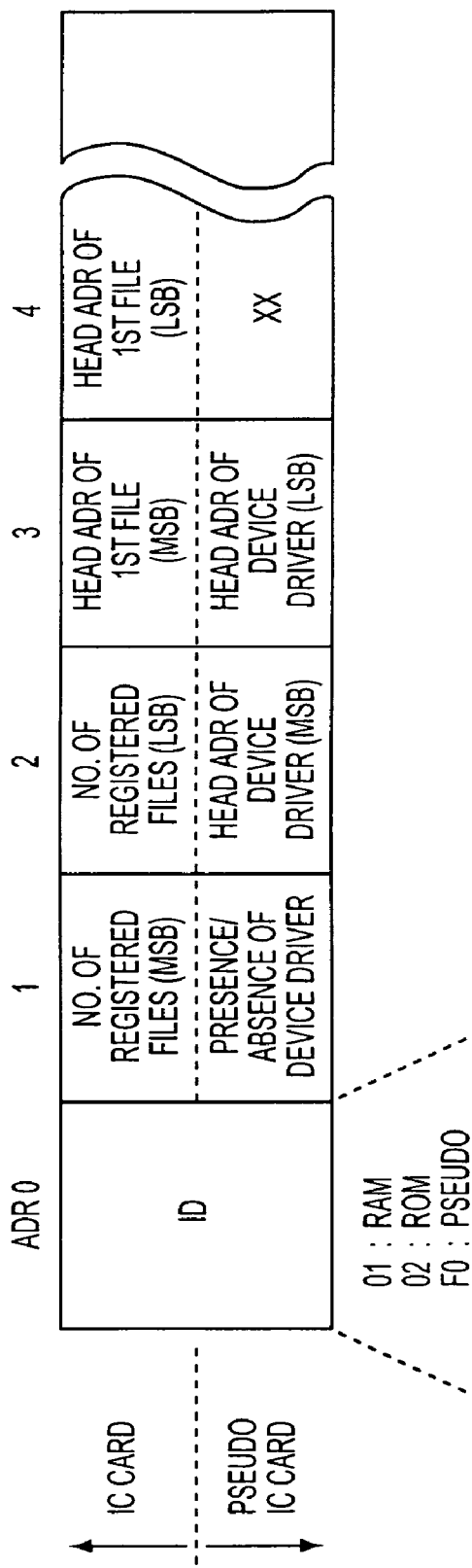
FIG. 5 is an explanatory diagram showing a data construction to distinguish between an IC card and a pseudo IC card.

In the next step S2, directory management data stored in the head address of the IC card 50 or pseudo IC card 1 as shown in FIG. 5 is read in order to automatically discriminate whether the IC card has been connected or the pseudo IC card has been connected to the IC card connector 60.

FIG. 5 shows information for the CPU 65 to handle the IC card 50 or pseudo IC card 1 as a file. Such information is stored into addresses 0 to 4 of the IC card 50 or pseudo IC card 1.

As shown in the diagram, different kinds of data are stored into those addresses by the IC card 50 or pseudo IC card 1.

Information (01 (hexadecimal notation) in the case where the device is an RAM card; 02 in the case of ROM card; F0 in the case of the pseudo IC card 1) indicative of the kind of IC card 50 or the distinction between the IC card 50 and the pseudo IC card 1 is stored into address 0.

In the case of the IC card 50, words (stored in addresses 1 and 2) indicative of the number of registered files and words (stored in addresses 3 and 4) indicative of the head address of the first file are stored into subsequent addresses 1 to 4. Necessary file location information is stored into the subsequent addresses.

In the case of the pseudo IC card 1, the head address of a device driver program to gain access to the pseudo IC card 1 stored in the ROM 83 on the apparatus main body side is stored into addresses 2 and 3.

In step S2, the data indicative of the kind of device in address 0 is read and when the data kind indicates the IC card, the processing routine advances to steps S3 and S5. An ordinary IC card control driver software written in the ROM 83 is loaded into the RAM 82. The CPU 65 sequentially executes programs stored in the RAM 82 and controls a method of giving a signal to the IC card connector and handles the IC card 50 as an ROM card or an RAM card. The above operations are substantially the same as those in the conventional apparatus.

On the other hand, in the case where the read directory management data indicates the pseudo IC card in step S2, step S4 follows and the device driver program for the pseudo IC card control is loaded from the ROM 83 into the RAM 82. After that, in the run of the operating system in steps S6 to S8, the CPU 65 sequentially executes the programs in the RAM 82 and changes a method of giving signals to the IC card connector 60 to a method of giving control signals according to the kind of external device which is connected.

On the pseudo IC card 1 side, a high-speed communication by parallel transfer using the CPU bus is executed between the data processing apparatus 90 and the CPU 65. The external device controller 4 executes the necessary data conversion or interface conversion on the basis of the high-speed communication, thereby performing the input/output operation to the external device 11.

As mentioned above, the electronic apparatus can be used for expansion of an external memory or for control of an external device by using the IC card connecting portion of the data processing apparatus 90 through the pseudo IC card 1 in which the shape, signal arrangement, and characteristics are the same as those of the IC card section. Therefore, even in a small data processing apparatus such that there is no space enough to attach a connector terminal for expansion of an external memory and only a slot (inserting hole) of an IC card can be arranged, the transmission and reception of data with an external device can be realized by the high-speed parallel data transmission using the CPU bus.

Figure 6:
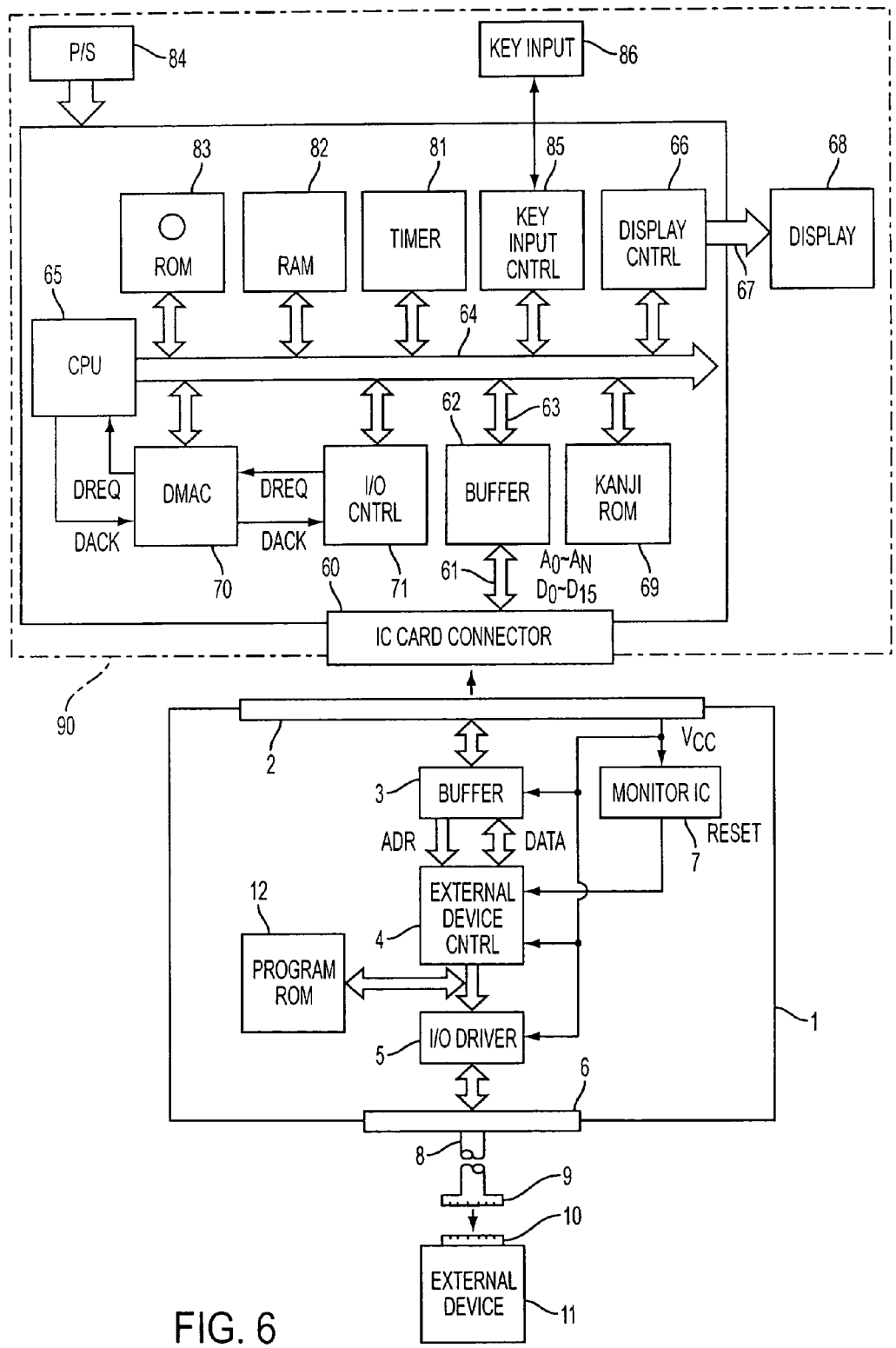
FIG. 6 is a block diagram showing an embodiment of a different control system of the electronic apparatus.

In the above embodiment, the device driver program to execute the input/output operation to/from the pseudo IC card 1 is stored into the ROM 82 on the data processing apparatus 90 side. As shown in FIG. 6, however, it is also possible to construct in a manner such that an ROM 12 is provided for the pseudo IC card 1 and a device driver program to execute the interface which is peculiar to the pseudo IC card 1 is stored therein and is transferred to the RAM 82 on the apparatus main body side at the start of the program.

In the above case, when it is determined that the pseudo IC card 1 is connected in the discrimination about the device in step S2 in FIG. 4, for the access procedure, the device driver program is loaded not from the RAM 82 but from the ROM 12 in the pseudo IC card 1 in step S4.

According to the above construction, a device driver such that the use of the pseudo IC card 1 will not be presumed in future doesn't need to be stored into the main memory in vain. The main memory comprising the ROM and RAM on the main body side of the data processing apparatus 90 can be saved and effectively used.

Since the device driver program is stored in the pseudo IC card 1, the change and maintenance of the device driver program can be also easily performed.

Further, in the above embodiment, although the data processing apparatus has been considered as an electronic apparatus which handles characters such as word processor, note-shaped personal computer, electronic pocketbook, or the like, the invention is also effective for all of apparatuses using an IC card such as electronic calculator which handles numerals, facsimile apparatus which handles a video image, electronic camera, and the like.

Figure 7:
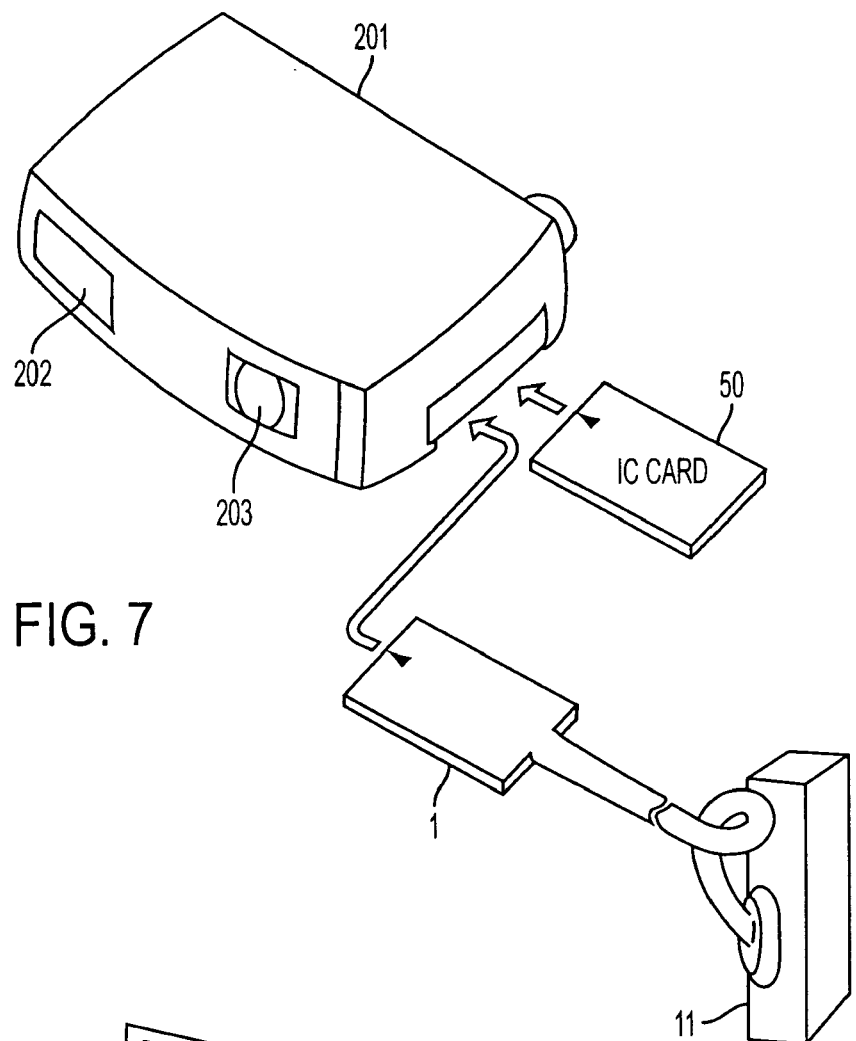
FIG. 7 is a perspective view showing a state in which the invention is applied to an electronic camera.
Figure 8:
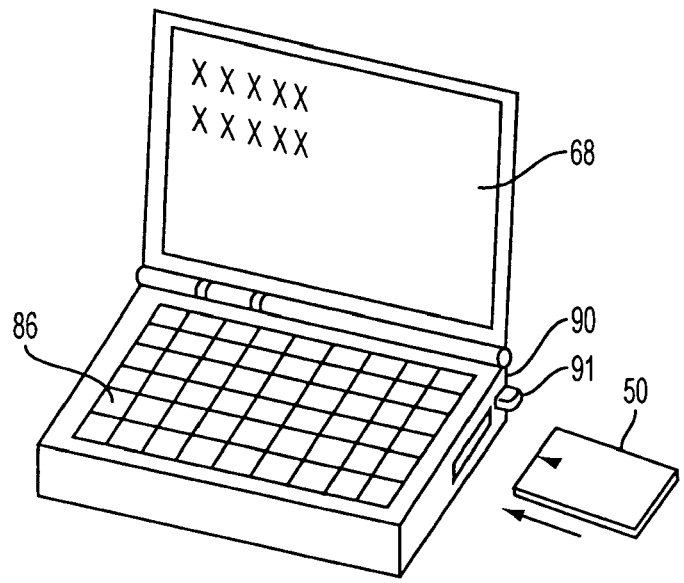
FIG. 8 is a perspective view showing a construction of a conventional electronic apparatus.
Figure 9:
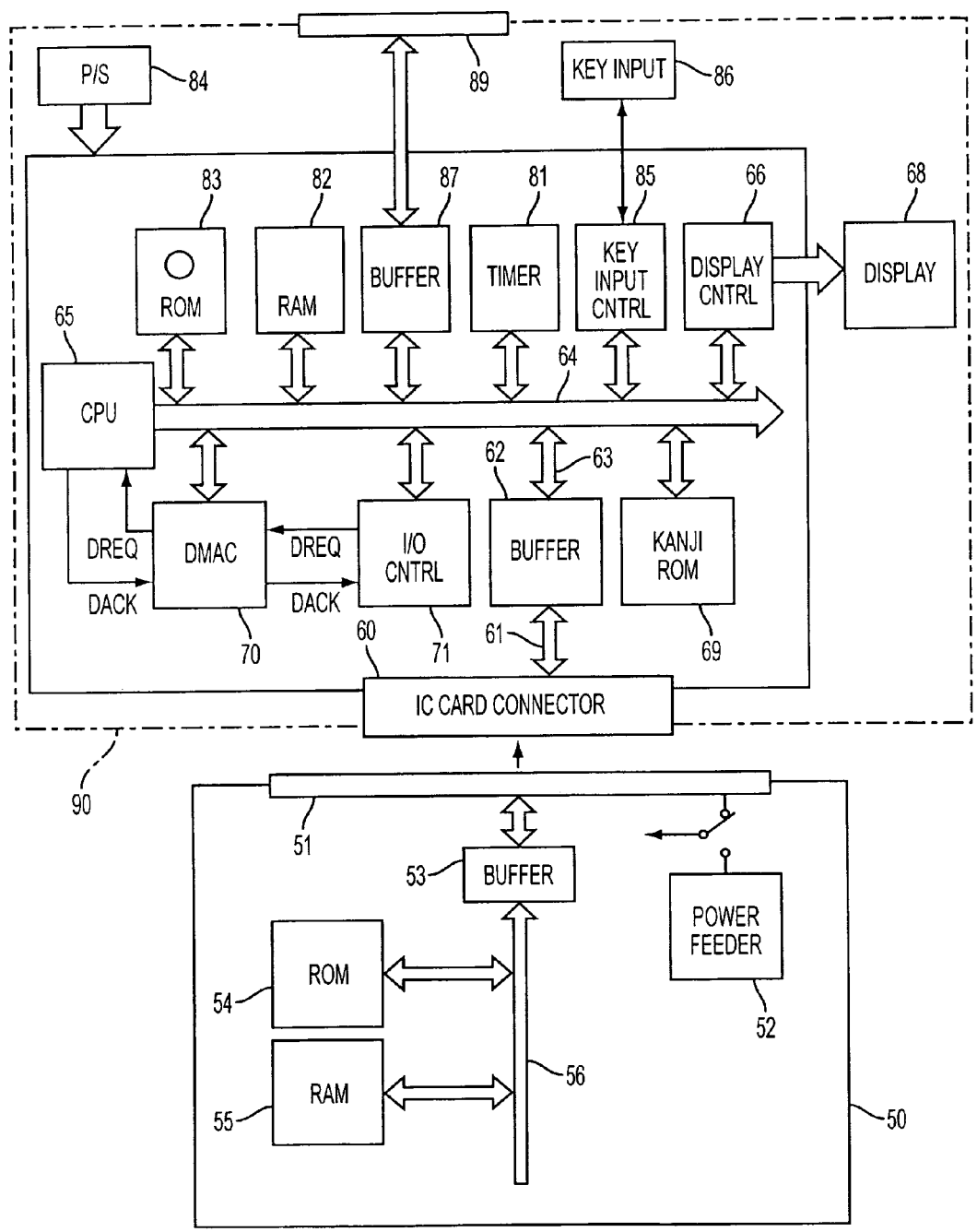
FIG. 9 is a block diagram showing a construction of a control system of the conventional electronic apparatus.

FIG. 7 shows a schematic diagram when the invention is applied to an IC card camera. FIG. 7 shows an electronic camera which stores photographed images into the IC card 50. Reference numeral 202 denotes a flash to photograph and 203 indicates a lens to photograph. The other construction of the camera mechanism is substantially the same as that of the conventional apparatus except a different point that in the control system of the camera, the portion which handles the interface of the IC card 50 is constructed as shown in FIG. 1 or 6 to thereby enable the pseudo IC card 1 as mentioned above to be connected.

According to the above construction, the external device 11 can be connected through the pseudo IC card 1 in place of the IC card 50 and the number of photographed images of about tens of images can be remarkably increased.

In the above embodiment, upon start of the program, the discrimination between the pseudo IC card 1 and the IC card 50 and the setting of the device driver are executed. Upon exchange of the pseudo IC card 1 and IC card 50, the discrimination about the device, the loading of the device driver, and the like can be also dynamically performed.

Further, in the above embodiment, the pseudo IC card 1 and the external device are connected by using the cable. However, the cable is not an indispensable element and the pseudo IC card 1 can be also directly attached to the external device.

As will be obviously understood from the above explanation, according to the invention, in an electronic apparatus in which a detachable IC card is connected to the IC card junction portion and the CPU bus of the electronic apparatus main body is connected to the IC card by the junction portion and the IC card is used as an external memory device, there is provided the pseudo card means having a junction portion which can be connected to the IC card junction portion of the electronic apparatus main body, and further, the pseudo card means has therein the control means for converting the data input/output interface between the electronic apparatus and the pseudo card means and the data input/output interface between a predetermined external device and the pseudo card means, and the data input/output operation is executed between the electronic apparatus main body and the external device through the pseudo card means. Therefore, there is an excellent advantage such that even in a small data processing apparatus in which the connector terminal for expansion of an external memory cannot be separately attached, the data input/output operation can be executed between the apparatus main body and an external device at a high speed by using the bus of the IC card through the pseudo card means connected to the IC card junction portion.

What is claimed is:
1. An information processing apparatus comprising:
a connection unit, arranged for connecting a detachable external device to said information processing apparatus;
a recognition unit, arranged for recognizing connection of the external device to said information processing apparatus;
a discrimination unit, arranged for discriminating a device type of the external device connected by said connection unit, in response to said recognition unit recognizing connection of the external device, on the basis of data stored in the connected external device; and a switching control unit, arranged for controlling switching between obtaining a device driver program provided in the external device, for controlling the connected external device, and loading a device driver program existing in a memory area provided in said information processing apparatus, for controlling the connected external device, on the basis of the device type discriminated by said discrimination unit.

2. An apparatus according to claim 1, further comprising a control unit arranged for controlling the connected external device based on the device driver program obtained from the external device or based on the device driver program existing in the memory area of said information processing apparatus.

3. An apparatus according to claim 1, further comprising a reading unit arranged for reading data indicating the device type of the connected external device from the external device, wherein said discrimination unit discriminates the device type on the basis of the data read by said reading unit.

4. An apparatus according to claim 1, wherein said information processing apparatus is an electronic camera.

5. A method of loading a device driver program for controlling an external device detachably connected to an information processing apparatus, said method comprising:

a recognizing step of recognizing connection of the external device to the information processing apparatus;

a discriminating step of discriminating a device type of the connected external device, in response to said recognition step recognizing connection of the external device, on the basis of data stored in the connected external device; and a switching control step of controlling switching between obtaining a device driver program provided in the external device and loading a device driver program existing in a memory area provided in the information processing apparatus, on the basis of the discriminated device type.

6. A method according to claim 5, further comprising a controlling step of controlling the connected external device based on the device driver program obtained from the external device or based on the device driver program existing in the memory area of the information processing apparatus.

7. A method according to claim 5, further comprising a reading step of reading data indicating the device type of the connected external, device from the external device, wherein said discriminating step discriminates the device type on the basis of the data read in said reading step.

8. A computer program for instructing an information processing apparatus to perform:

a recognizing step of recognizing connection of an external device to the information processing apparatus;

a discriminating step of discriminating a device type of the connected external device, in response to said recognition step recognizing connection of the external device, on the basis of data stored in the connected external device; and a switching control step of controlling switching between obtaining a device driver program provided in the external device and loading a device driver program existing in a memory area provided in the information processing apparatus, on the basis of the discriminated device type.

* * * * *

UNITED STATES PATENT AND TRADEMARK OFFICE
CERTIFICATE OF CORRECTION

PATENT NO. : 6,948,006 B1
DATED : September 20, 2005
INVENTOR(S) : Tomishige Taguchi It is certified that error appears in the above-identified patent and that said Letters Patent is hereby corrected as shown below:

<u>Title page,</u>
Item [56], References Cited, FOREIGN PATENT DOCUMENTS,
"363273954" should read -- 63-273954 --.

<u>Column 3,</u>
Line 54, "softwares 1" should read -- softwares; --.
Line 56, "time 1" should read -- time; --.
Line 63, "KANJII" should read -- KANJI; --.

<u>Column 4,</u>
Line 17, "drvice" should read -- device --.

<u>Column 8,</u>
Line 13, "external," should read -- external --.

Signed and Sealed this

Eleventh Day of April, 2006

JON W. DUDAS
*Director of the United States Patent and Trademark Office*